Figure 1:
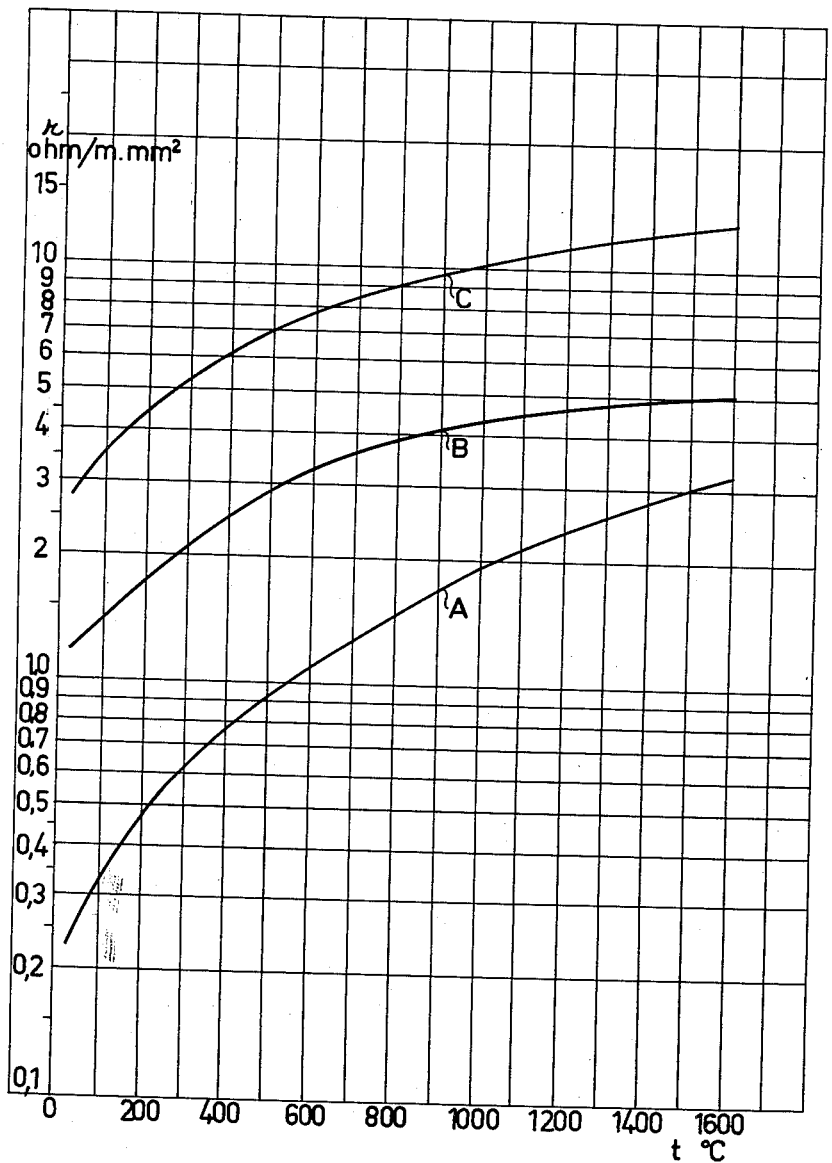

3,051,924
SINTERED ELECTRIC RESISTANCE HEATING ELEMENTS AND METHODS OF PRODUCING SUCH ELEMENTS
Styrbjörn Amberg and Nils Gustav Schrewelius, Hallstahammar, Sweden, assignors to Aktiebolaget Kanthal, Hallstahammar, Sweden
Filed July 6, 1959, Ser. No. 824,993
Claims priority, application Sweden July 5, 1958
7 Claims. (Cl. 338—330)

The present invention relates to sintered materials and products thereof as well as to methods of producing such materials or products, and more specifically it has for its object to provide a sintered material of high mechanical strength which is oxidation-resistant at high temperatures and has favorable electrical characteristics making the material particularly adapted for use in electric resistance heating elements to be operated in non-inert atmospheres and at high temperature.

A resistance element according to the invention consists—in its high temperature part, at least—of a sintered body which is composed of a metallically conductive alloy component containing at least molybdenum, silicon and aluminium, and, optionally, of a comminuted ceramic component. A characteristic feature of the metallic component resides in that its composition should always satisfy the basic formula $(Mo_{1-y}M_y)(Si_{1-x}Al_x)_2$, where M represents one or more of the metals Ti, Zr, Hf, Ta, Nb, V, W and Cr, and where $x$ may range from 0.1 to 0.6 and the upper limit of $y$ may range up to 0.7 and in that its crystal structure is of the type C 40. As will be more closely described below, the upper limit of $y$ may be different for different metals M.

It is a well-known fact that silicon-containing protective coatings or skins on molybdenum silicide surfaces will be improved if aluminium is also included in the coating. Such improvement is considered to result from the feature that the oxide coating forming in atmospheric air at high temperature would not consist of silicon dioxide only, but also of an aluminium silicate, such as mullite, for example, which is assumed to possess more advantageous characteristics.

Pure $MoSi_2$ crystallizes according to the tetragonal lattice type C 11, whereas the metallic material according to the present invention crystallizes according to the hexagonal lattice type C 40. The lattice constants of the C 40 phase within the scope of the invention vary according to the composition. For $y=0$ the following ranges of values of the lattice constants, $a$ and $c$, were obtained:

$a$: 4.65 to 4.76 $kx$
$c$: 6.53 to 6.57 $kx$ in which $kx$ is a unit corresponding to 10−7 millimeters.
The substitution of Al for Si in the formula $$Mo(Si_{1-x}Al_x)_2$$

will thus cause the lattice to expand due to the fact that the aluminium atom is larger than the silicon atom. Similarly, the substitution of M for Mo will cause lattice expansion if M is W, Ta, Nb, Ti, Zr or Hf, and lattice contraction if M is Cr or V.

It has now been found, quite surprisingly, that said metallic material of the C 40-lattice type possesses electrical characteristics which are more advantageous than those of $MoSi_2$ and further has good oxidation resistance and mechanical strength provided the C 40 phase is the single component that possesses metallic electrical conductivity.

The invention will be more closely described with reference to the accompanying drawings on which FIGS. 1 to 10 are diagrams.

FIG. 1 of the accompanying drawings shows how the resistivity $r$ varies as a function of the temperature $t°$ C. for $MoSi_2$ having C 11 structure (curve A) and for an alloy according to the present invention (curve B) having C 40 structure and the composition: $Mo(Si_{0.8}Al_{0.2})$. In both cases the specimens were poreless and consisted exclusively of crystals of C 11 and C 40-type respectively. For $MoSi_2$ the resistivity increases within the range 20° C. to 1600° C. from 0.23 to 3.2 ohm mm.²/m., i.e. by 1400%, whereas the alloy according to the present invention exhibits an increase from 1.2 to 5 ohm mm.²/m., i.e. by 315% only. It is of great importance in practice to be able, by a comparatively slight change in the chemical composition of molybdenum disilicide, to obtain a product of the C 40 alloy type having a resistivity which, at all practical temperatures, is at least four times as high as that of pure $MoSi_2$. This has made it possible for the first time, without the use of any degrading oxide additions, to produce resistance elements on a molybdenum silicide basis and in which the heating zone and the cool terminal end portions are of identical, or nearly identical, cross-sectional areas. As a matter of fact, if the terminal end portions consist of pure $MoSi_2$ the cooling effect caused thereby will be sufficient to make unnecessary any impractical and costly enlargement of cross-sectional area of the terminal end portions of the element. The specific resistance $r$ as a function of temperature for such a combination of crystals of C 40-type and a suitable oxide component is shown in FIG. 1, curve C. The lowered thermal coefficient of electrical resistivity of the resistor of C 40 alloy type is, of course, another advantage of great practical and economical importance, particularly in connection with large furnace plants.

A further advantage of elements according to the invention resides in that their mechanical strength is higher than that of elements of $MoSi_2$ which fact, of course, is of great importance where inherently brittle materials are concerned. By the use of suitable binders, such as binders containing at most 40% by weight of $SiO_2$ and a balance of substantially $Al_2O_3$ in a highly comminuted condition, and preferably in glass-form, the strength characteristics of the material can be further improved.

Contrary to previous statements, we have found that the oxide coating which forms on the surface of Mo-Si-Al-alloys of the kind described will not show as satisfactory characteristics as does the pure quartz glass forming on molybdenum disilicide. Therefore, according to the present invention, it is contemplated to add a small portion of boron in one form or another which will impart to the protective coating a more glass-like structure and more favorable characteristics than those obtaining for the mullite-containing glaze forming on the resistance elements in the absence of boron. Such boron may be added to the alloy proper, or it may be included by adding borides, borates or boric acid in the powder-metallurgical process of producing the material. Since the amount of boron thus added should be small, suitably less than 0.3% by weight of the sintered body, it has not been possible to state just in which form the boron is contained in the final product. Thus it is conceivable that the composition of the C 40 phase, $Mo(Si, Al)_2$ may have been slightly modified by a slight amount of silicon or aluminium having been replaced by boron.

Figure 2:
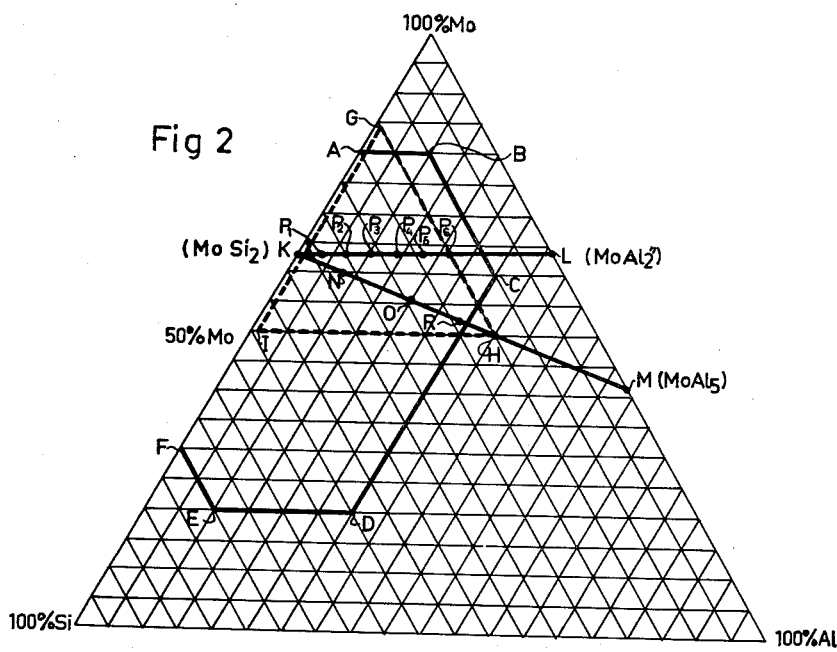

The composition of Mo-Si-Al-alloys contained in resistance elements according to the invention will appear from FIG. 2 of the accompanying drawings showing a triangular graph plotting the percentage weights of molybdenum, silicon and aluminium contained in the material. For the purpose of comparison, this graph also includes the compositions of previously known alloys containing molybdenum, silicon and aluminium. The hexagon A—B—C—D—E—F represents the area covered by alloys previously described in the specification of the co-pending application Serial No. 657,058, now Patent No. 3,027,330. The triangle G—H—I represents the area covered by the British patent specification No. 731,616. The U.S.A. patent specification No. 2,831,242 to Kieffer et al. covers electric resistance materials produced by sintering 60 to 70 parts by weight of molybdenum and silicon in proportions corresponding stoichiometrically to $MoSi_2$, and 10 to 30 parts by weight of molybdenum and aluminium in proportions corresponding to $MoAl_5$. The possible range of variation of the composition of the silicide-aluminide component according to Kieffer is represented in the graph of FIG. 2 by the line N—O, forming part of the line K—M, where K corresponds to the composition $MoSi_2$ and M corresponds to the composition $MoAl_5$. On the other hand, alloys containing Mo, Si and Al in accordance with the present invention are to have a composition corresponding to the line K—L, i.e. corresponding to the formula $Mo(Si, Al)_2$.

It has been noticed, as a result of experiments carried out in connection with the present invention, that upon sintering mixtures of molybdenum, aluminium and silicon in proportions corresponding to points along the line K—M, a mixture of several phases are obtained, including, inter alia, a molybdenum-silicide-aluminide of a basic composition corresponding to $Mo(Si_{1-x}Al_x)_2$ and which crystallizes according to the C 40-lattice type. For example, for an alloy located at point N one constituent was found to be a composition corresponding to a value of $x=0.2$ in the above formula. It is self-evident, however, that aluminium or substances rich in aluminium must be present besides the C 40-lattice type since the total content of (Al+Si) is larger than that corresponding to the formula $Mo(Si, Al)_2$. If a material of the above-stated composition is to be used for electric resistance elements to be operated in an oxidizing atmosphere at high temperature, the presence of such less oxidation-resistant aluminium-containing impurities will involve a degradation of the overall characteristics of the alloys produced.

Also compositions located along the line K—L, i.e. between the points of $MoSi_2$ and $MoAl_2$, have been investigated in connection with the present invention. Such investigation has shown that sintering of molybdenum, silicon and aluminium in these proportions at 1300° in hydrogen will not create a pure C 40-structure but rather a mixture of C 40 with other phases, inter alia $Mo_5Si_3$. Also such mixtures have been found to be less suitable as electric resistance materials for high-temperature operation. It has generally been established by several tests run with mixtures of molybdenum, silicon and aluminium in quite different proportions, that it is very difficult to obtain a pure C 40-phase. Without being restricted to our theory, we would interpret these test results by the assumption that an amount of aluminium in excess is able to enhance the formation of the desirable C 40-phase $Mo(Si, Al)_2$. This excess of aluminium should be of a size such as to cause the composition of the mixture to be located along the line O—H in FIG. 2. The C 40-phase thus obtained may have the non-desired aluminium in excess removed from it by leaching with an acid and the rest consisting of pure C 40-phase may or may not be mixed with a binder and thereafter sintered in a conventional manner into resistance elements. If the aluminium content of the acid-leached pure C 40-alloy should still be too high it may be "diluted" before the sintering step by adding pure $MoSi_2$ to the mixture. Thereby the value of $x$ in the formula $Mo(Si_{1-x}Al_x)_2$ can be reduced from the range 0.3–0.6 to the range 0.1–0.3. In FIG. 2 different values of $x$ have been inserted at points $P_1$ to $P_6$, the point $P_1$ representing $x=0.1$, $P_2$ representing $x=0.2$, etc. up to $P_6$ representing $x=0.6$.

According to a specific embodiment of the present invention it has been found, quite surprisingly, that an addition of moderate amounts of one or more of the remaining transition elements of groups IV, V and VI of the periodic table may overcome the above-mentioned difficulties, thus making it possible by direct sintering of the initial material in comminuted form without acid-leaching to produce a pure C 40-phase which is excellently suited as an electric resistance material for high-temperature operation in air. It has been found by X-ray crystallographical examination that the metals (M) added will partially replace the molybdenum in the composition $Mo(Si_{1-x}Al_x)_2$, i.e. according to the formula: $(Mo, M) (Si, Al)_2$. It has been found particularly advantageous to add metals of the kind forming disilicides which crystallize according to the C 40-lattice type, i.e. Cr, Ta, Nb and V. Nevertheless it is possible, however, to obtain the corresponding effect by an addition of other metals the disilicides of which do not crystallize according to the C 40-lattice type, for instance W, Zr, Hf and Ti. An addition of $TiSi_2$ to pure $MoSi_2$, as previously known, will give rise to a C 40-phase, and therefore Ti is used in alloys according to the present invention. One such alloy which may be used to advantage has the following composition:

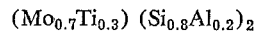

$(Mo_{0.7}Ti_{0.3}) (Si_{0.8}Al_{0.2})_2$

The addition of the metal (M) should be adapted to the results desired and also depends on the value of $x$. It has been found as a result of practical experiments that a stable, pure C 40-structure will be obtained if 2 to 70 atom percents of the molybdenum contained is replaced by another metal, where the upper limit depends on the kind of metal added.

It should be mentioned that in the specification of the co-pending application Serial No. 434,124, now forfeited, we state that a product of the reaction between 40% of $TaSi_2$ and 60% of $MoSi_2$ will yield a pure C 40-phase of the composition $(Mo, Ta)Si_2$. Practical experiments have shown, however, that this product exhibits insufficient resistance to thermal shocks which makes the same unusable for electric resistance heating elements which are subjected to violent temperature changes. The material of the present invention distinguishes from this material, as well as from other mixed disilicides of the C 40-type, in that it has been found to be well adapted for operation at 1700° C. in air and to withstand stresses of any kind encountered under operating conditions. In addition, the material exhibits the low thermal coefficient of electrical resistivity characteristic of certain C 40-structures. Thus alloys according to this aspect of the invention should include products of the composition

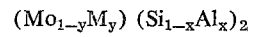

$(Mo_{1-y}M_y) (Si_{1-x}Al_x)_2$ where $x$ ranges from 0.1 to 0.6, M may be any one of the elements Ti, Zr, Hf, V, Ta, Nb, W and Cr, and $y$ ranges from 0.02 to 0.70.

A resistance element according to the invention preferably comprises an incandescent or heating zone and two terminal end portions, the silicide component of said incandescent zone being constituted by an alloy according to the present invention, whereas that of the terminal end portions preferably consists of pure $MoSi_2$. Both the incandescent zone and the terminal end portions may optionally include 50% by volume, at most, of a comminuted ceramic component, preferably a glass containing $SiO_2$. Falling within the scope of the invention are also resistance elements produced by so-called flame spraying, or spray metallization, for example, and in which the incandescent zone is formed by a layer having a thickness of 10 to 500 microns and applied on to an insulating refractory base member.

The process of producing elements according to the present invention may be carried out in several different ways, as will appear from the following examples:

*Example 1*

A pulverulent mixture of 6% Ta, 60% Mo, 26% Si and 8% Al is heated in hydrogen at 1300° C. As a result of an exothermic reaction a spongy product will form and by X-ray analysis it was found to consist exclusively of a C 40-alloy having the composition: $(Mo_{0.95}Ta_{0.05})(Si_{0.76}Al_{0.24})_2$.

The alloy is ground in a ball mill into a grain size less than 10 microns and is mixed with 5% of plasticized bentonite in a vacuum kneader. The mass is extruded into a round wire 7 mm. in diameter which is dried and subjected to pre-sintering in hydrogen gas at a temperature between 800 and 1400° C. Final sintering then takes place during 2 minutes by passing electric current directly through the wire in air at 1500 to 1700° C. The terminal end portions are produced in an identical manner, but in this case, besides bentonite, a powder exclusively of molybdenum disilicide is used. After face grinding the ends of the incandescent zone and terminal end pieces these are sintered together by electric butt welding. Subsequently the terminal end portions of the resistance element formed are equipped with terminal contacts, for instance of aluminium, which do not require additional cooling owing to the great difference in resistivity as between the two alloys of the terminal end portions and the incandescent zone respectively. If the length of the incandescent zone is 500 mm. and that of each terminal end portion is 250 mm., the total weight of the element will only be 162 g. On the other hand, if the incandescent zone as well were based on $MoSi_2$ as the silicide alloy, it would have been necessary to produce terminal end portions having a cross-sectional area four times as large which would have resulted in a total weight of 410 g. for the resistance element.

*Example 2*

According to a specific embodiment of Example 1 it is suitable to add to the expanded bentonite a solution containing boric acid amounting to 0.01% by weight of the powder mixture. This will involve the favorable result that, in the step of sintering the incandescent zone, the ceramic component and the protective surface layer obtaining due to oxidation, will contain, in addition to $SiO_2$ and $Al_2O_3$, also small amounts of $B_2O_3$ which will result in an advantageous increase in mechanical strength of the resistance element.

*Example 3*

A powder mixture of 53% Mo, 18% Si and 29% Al (point R in FIG. 2), i.e. in proportions corresponding to one part by weight of $MoSi_2$ and one part by weight of $MoAl_5$, is reacted in hydrogen at about 1300° C. and is then crushed into a particle size less than 50 microns. The powder is leached for 5 minutes with cold diluted (1:10) hydrochloric acid, dissolving substantially aluminium. On X-ray analysis the remainder was found to be a material of the C 40-lattic type corresponding approximately to the formula: $Mo(Si_{0.5}Al_{0.5})_2$. After the leaching step one part by weight of the powder is mixed with two parts by weight of a powder of $MoSi_2$ and is ground in a ball mill until 90% thereof have a grain size less than 6 microns. Then the mixture is shaped and sintered in the same way as according to Example 1. A chemical and X-ray analysis of the alloy of the final product shows that it will crystallize completely according to the C 40-lattice type and has the composition: 63% Mo, 30% Si and 7% Al, corresponding to $Mo(Si_{0.8}Al_{0.2})_2$ (point $P_2$ in FIG. 2). It will be possible to carry out leaching even if up to 70 atom percent of the Mo has been replaced by the metals M.

*Example 4*

A pulverulent mixture of 10.5% Ti, 49.0% Mo, 8% Al and 32.5% Si was heated in hydrogen gas at 1300° C. The product of the reaction was treated as in Example 1 and resulted in a resistance element in which the alloy of the incandescent heating zone had the composition $(Mo_{0.7}Ti_{0.3})(Si_{0.8}Al_{0.2})_2$.

*Example 5*

The pulverulent mixture had the composition: 6% Ta, 60% Mo, 25.7% Si, 8% Al and 0.3% B. The production of resistance elements was carried out as in Example 1. A slight amount of boron is oxidized in the final sintering of the incandescent zone and is included both in the ceramic component and in the protective surface layer.

*Example 6*

A sillimanite rod ½" in diameter was coated by flame spray metallization with a layer 50 microns in thickness and of the composition $(Mo_{0.95}Ti_{0.05})(Si_{0.7}Al_{0.3})_2$. The terminal end portions of the element were of the identical composition but with a surface coating thickness of 200 microns. The spray metallization was carried out with a conventional spray gun and using a wire containing 15% polyethene, 4% aluminium powder and 81% silicide powder of a grain size less than 6 microns.

In respect of a silico-alumide of Mo having C 40 structure and having aluminium substituted for 20 atoms percent of silicon ($x=0.2$) the variation of its specific resistance measured in ohms/m. $mm.^2$ as a function of the temperature $t°$ C. may be seen from FIG. 1, curve B, relating to this alloy in a poreless and oxideless state.

Figure 3:
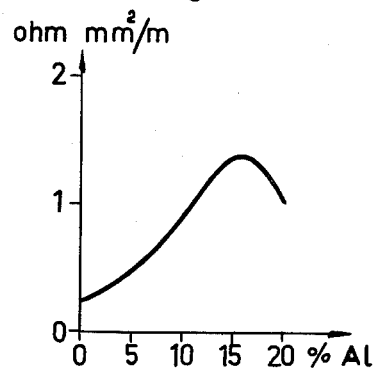

In FIG. 3 the resistance values obtained at room temperature in a series of tests of sintered bodies have been recalculated to the hypothetical resistance values of a poreless, oxideless alloy, which constitutes that component of the sintered body which possesses electrical conductivity of metallic character. These values have then been plotted as a function of the aluminium content of the alloy in percent by weight. The specific electric resistance of the alloy at 20° C. rises then from about 0.25 for $MoSi_2$ to about 1.4 at a content of 16% Al ($x=0.43$). It decreases then towards 1.0 at 20% Al ($x-0.54$). Within the range of 8 to 20% Al ($x=0.21$ to 0.54) it is considered that the alloy consists of crystals of the pure C 40-type.

Figure 4:
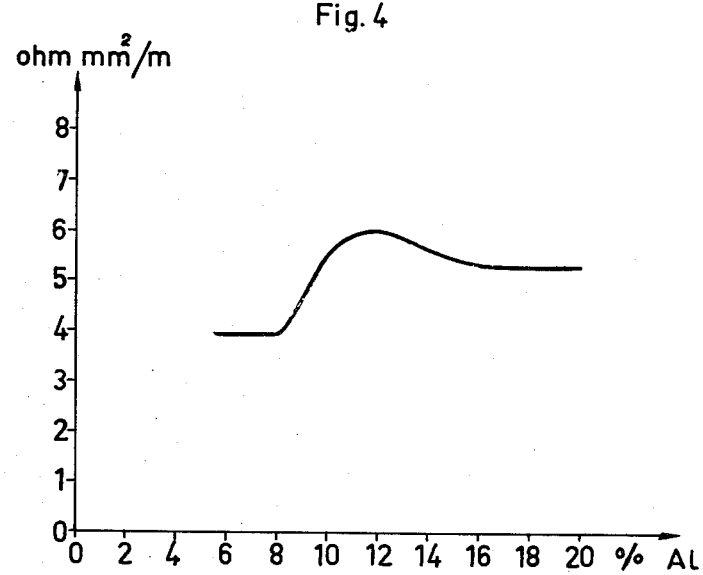
Figure 5:
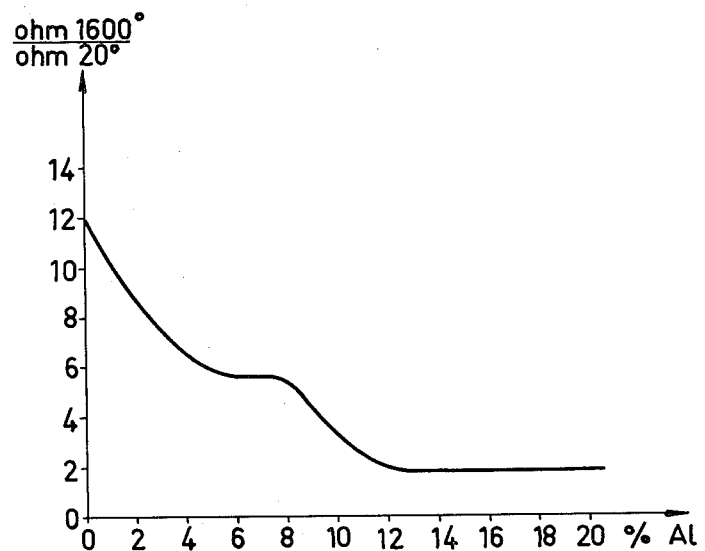

In FIG. 4 the specific resistance at 20° C. is plotted as a function of the Al-content of a sintered body which, in addition to the alloy $Mo(Si_{1-x}Al_x)_2$, contains 19.2% aluminium oxide (tonerde) and 0.8% Fe. As the specific resistance at 20° C. increases with increasing aluminium content it holds true that, in respect of the temperature coefficient of the resistance counted as the ratio or quotient of the resistance at 1600° C. divided by the resistance at 20° C., this coefficient will, on the contrary, fall rapidly according to FIG. 5 which illustrates the fact how the temperature coefficient depends on the content of aluminium in sintered bodies which, in addition to the alloy, include 19.2% alumina clay (tonerde) and 0.8% Fe in a very finely divided condition. At higher content of aluminium it is apparently possible to rely thereon that the temperature coefficient defined as above is only 2 which thus means a sharp reduction of the value obtained at a normal $MoSi_2$ body having a coefficient of about 12. It should, however, be pointed out that the dependency of the resistance on the temperature at varying aluminium contents affords an irregularity in the range of 8 to 12% Al as illustrated in FIGS. 4 and 5. For the time being no explanation could be given to this irregularity but reference is made to the fact that a similar irregularity also occurs in X-ray crystallographical examinations of structures.

Above it has been pointed out that in X-ray crystallographical examinations of the hexagonal lattice it has been found that the lattice constants are altered when aluminium is substituted for silicon. The extreme values for the $a$-axis were determined to be 4.65 to 4.36 and for the $c$-axis 6.53 to 6.57 $kx$. A close examination of the variation of the axes depending on the quantity of added aluminium indicated that the $a$-axis is increased rather regularly from a minimum value of 4.63 to a maximum value of 4.75 $kx$ when the aluminium content was increased from 6 to 20%. On the other hand, the c-axis follows a queer course which, for the rest, also varies with the performance of the sintering process and the composition of the oxide component. Thus in one case it was observed that the c-axis at 6% aluminium content was 6.65 $kx$ and that it decreased to 6.53 $kx$ when the aluminium content was raised to 10% and then again started to rise to a maximum of 6.60 at about 15% Al and then again started to fall down to reach the value 6.57 at 20% Al. At another composition of the oxide component the c-axis was found to be nearly constant at 6.54 $kx$ at additions of from 6 to 16% Al whereas this axis then started to rise up to 6.57 $kx$ at 20% Al. Also in this case it has not been possible to give any strict explanation of the irregularity but it has probably something to do with the fluctuations of the temperature coefficient of the electrical resistance.

Experiments carried out with a view to manufacture dense sintered bodies based on the above defined alloy have proved that the ceramic binding means should not contain a too high content of $SiO_2$. Probably this is related with the fact that the aluminium atoms in the silicide component are able at a high temperature to react with the silica of the binding means while forming aluminium oxide and silicon. In trials in practice it has also been found that the aluminium content of the silicide component is decreased if such sintered bodies are heat treated.

On the other hand, trials have been made to use aluminium oxide as binding means and it has then been proved that it is suitable to use slurries of particularly finely divided $\gamma$-$Al_2O_3$, for instance of the type used for polishing purposes and called "tonerde."

To facilitate the sintered to produce a low porosity it is suitable to let about 20% of the weight of the material be constituted by this tonerde as binding means, partly replaced by bentonite as the case may be. Trials have been made to mix tonerde with bentonite and it has then been found suitable to use the same quantity tonerde as bentonite. Apparently the ceramic component will then contain a comparatively low concentration of $SiO_2$ and any detrimental reaction with the aluminium of the silicide component could not be noticed. In heat treating such sintered bodies in a technically pure protecting atmosphere of a moderate temperature a small quantity $SiO_2$ is formed as in case of sintering $MoSi_2$ and the oxide component will then generally contain a small quantity of $SiO_2$ even if this was not added from the beginning as binding means. The final composition of the oxide component may thus be from zero to 40% by weight $SiO_2$ and the balance $Al_2O_3$ together with other oxides, preferably of the type having a higher heat of formation than $Al_2O_3$. The reaction between binding means having a high content of $SiO_2$ and the aluminium content of the silicide component may also appear from FIG. 10 in which the content of crystals of C 40-type of the alloy is plotted as a function of the quantity of added aluminium in the silicide component in respect of three different sintered bodies. In the curve A there are used 20% bentonite as binding means, in curve B 5% bentonite and 15% tonerde and in curve C 20% tonerde. When bentonite alone is used as binding means about 20% aluminium is required to form solely crystals of C 40-type whereas in the two remaining cases it is indicated that only 10% Al is necessary to form the C 40-type. In both these cases the quantity of $SiO_2$ in the binding means has been insufficient to remove any larger quantity of Al from the silicide component.

It may be assumed that the ratio between the $Al_2O_3$ and $SiO_2$ contents obtained in the oxide formed at a light oxidation of C 40 powder should be about that ratio that gives a chemical balance between the silicide and the oxide component. In this way the correct composition of the ceramic component could be foreseen.

Such a test has been carried out on a powder having 15% Al according to formula $Mo(Si_{0.6}Al_{0.4})_2$ and an analysis of the oxide component gave 30% $SiO_2$ 60% $Al_2O_3$ and a balance, probably substantially $MoO_3$ and smaller quantities of other oxides. At a lower Si content in the alloy the $SiO_2$ content of the oxide component may rise up to 40%.

Molybdenum silicide containing aluminium is considerably more difficult to sinter to a poreless product than, for instance, pure $MoSi_2$. If a powder of, for instance, pure $MoSi_2$ having an average grain size of 43 microns is sintered 30 minutes at 1500° in hydrogen gas, there is obtained a shrinking of 12% by volume. If instead a molybdenum silicide powder is used containing 6% Al the corresponding shrinking will be only 1%. At higher Al contents the sintering will be somewhat improved, for instance, at 16% aluminium, 6½% shrinking. In both these cases 10% tonerde was used as binding means.

If instead bentonite is used the result will be slightly better but still a high temperature and a long sintering time are required to obtain a product with low porosity and mechanical strength. It has now been found that an addition of small quantities of ferrous sulfide to the tonerde will facilitate the sintering to a high degree. If the added quantity of ferrous sulfide is 0.5% of the weight of the sintered body the shrinking at a content of 6% Al will be 5% and at 16% Al 11%. If the addition of ferrous sulfide is only 0.05% still a considerable improvement is obtained, for instance, at 6% Al the shrinking will be 2.5% and at 16% Al 10%. In comparison with a material composed of $MoSi_2$ plus bentonite, however, a considerably higher sintering temperature and a longer sintering time will be required in the cited examples. This is indicated, inter alia, thereby that a sintering at 1400° C. produces a shrinking in respect of $MoSi_2$ plus bentonite of 9% but only 2.5% in respect of the aluminium containing product. At 1500° C. the corresponding values are 10% and 5.5%.

Also other additions have an advantageous influence on the porosity, such as small additions of iron, nickel, cobalt or their oxides, sodium fluoride and magnesium fluoride.

In practical efforts to extrude and sinter resistance elements containing the new aluminium containing alloy, it has been found that a sintering in air is difficult to carry out and requires a careful preceding heat treatment of the material for a sufficient time in hydrogen gas. The final sintering temperature must be kept higher than in respect of $MoSi_2$ and it should be above 1600°, preferably 1700° C. To avoid an unsuitable oxidation the heating up to the sintering temperature should be made very quickly, preferably on a time less than 30 seconds. It has been possible to weld a piece of an alloy of C 40-type onto a piece of an ordinary alloy of C 11-type the bending strength of the welded joint being then 16 kgs./mm.²

In the manufacture of resistance elements having terminals of $MoSi_2$ and an incandescent zone of an aluminium containing silicide the composition of the latter silicide should preferably be 12% Al, 24.5% Si and 63.5% Mo ($x=0.33$) being intermixed with 8% tonerde and 7% bentonite as binding means. Such elements may be used continuously at the same temperatures as the elements of pure $MoSi_2$ plus bentonite, i.e. up to 1700° C.

The pure C 40-phase in the system Mo—Si—Al, interbonded or not by means of an oxide component, complies thus in an excellent way with the requirements on an electrical resistance element for high temperatures. A condition is, of course, that beyond its oxide component this element only contains metallically conducting particles of pure C 40-phase.

Below three examples of test series of alloys are cited. In each case the alloys have been produced as follows. The entering metals are mixed in correct proportions and heated in hydrogen gas until a complete reaction has taken place. The reaction product is crushed and then milled during 120 hours in a ball mill so that an average grain size of about 3 to 7 microns is obtained. The powder is intermixed with tonerde and, as the case may be, bentonite and water, kneaded in vacuum, extruded, dried and sintered, at first to 1400° C. in hydrogen gas and then to 1700° C. in air.

Figure 6:
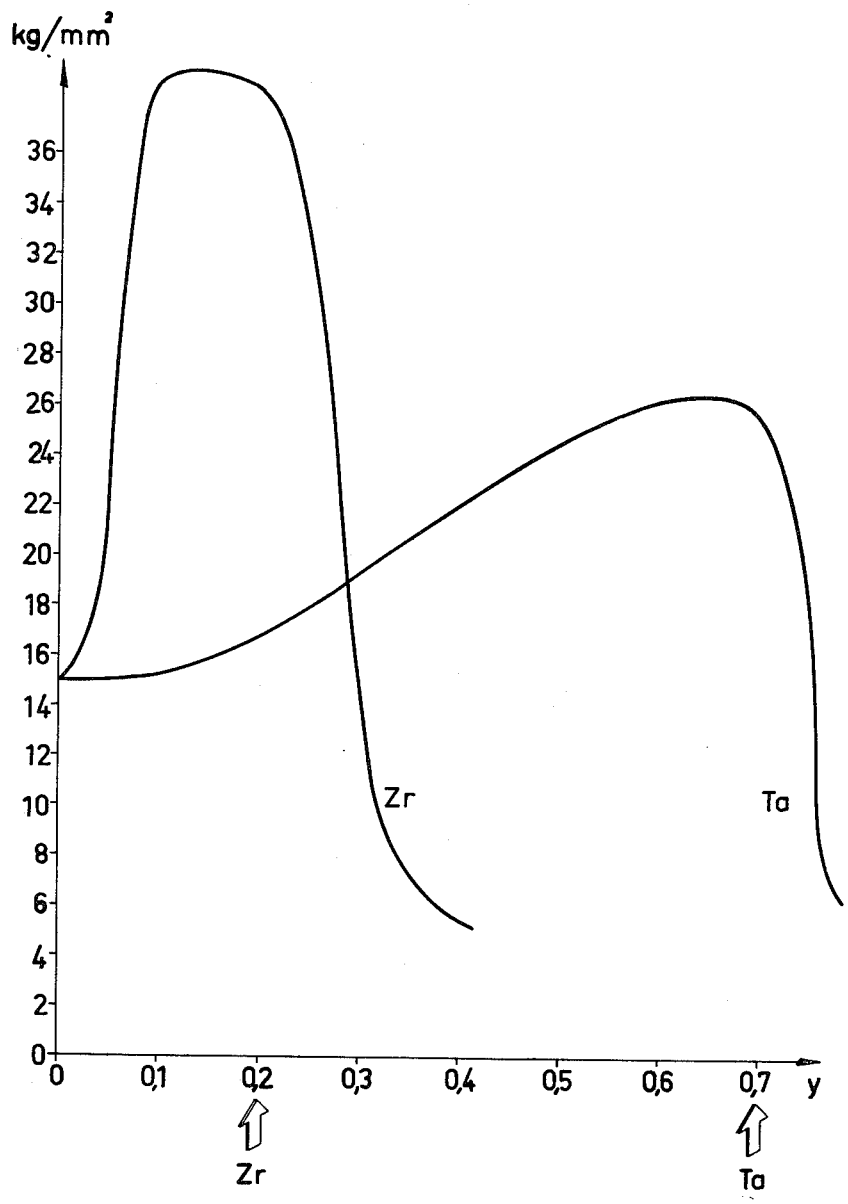
Figure 7:
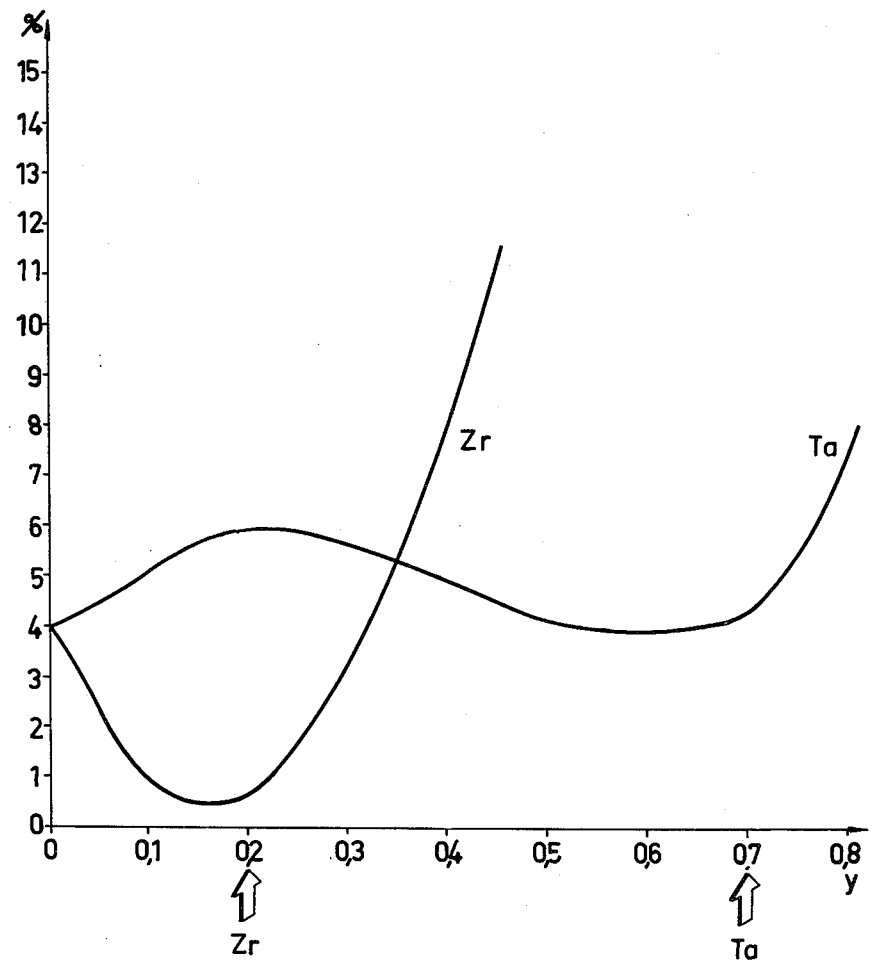

FIGS. 6 and 7 indicate variations in two important properties of two series of materials in which, on the one hand, Zr and, on the other hand, Ta is substituted for a fraction of the Mo content.

*Example 7*

In respect of Zr it was ascertained through X-ray crystallographical examination that other phases than C 40 began to occur when $y$ in the formula $$(Mo_{1-y}Zr_y)(Si_{0.6}Al_{0.4})_2$$

exceeded a value of 0.2. Of FIG. 6 it appears now clearly the advantage of the addition of the alloy substance Zr when a higher mechanical strength is required and also the disadvantage of exceeding the limit of solubility which limit in the case of Zr is at $y=0.2$. When passing this point there will be a sudden decrease in the mechanical strength. Another important property in connection with oxidation proof resistance material is its compactness or degree of porosity both from the point of view of mechanical strength and from the point of view of the resistance against oxidation attacks because a porous body has a greater surface exposed to oxidation than a poreless body and this porous body must necessarily be aged much quicker than the poreless body. According to FIG. 7 the addition of Zr has a very favorable influence on the compactness up to the limit of solubility at $y=0.2$ whereupon an increased addition of Zr results in a pronounced increase in porosity.

*Example 8*

According to this example Ta was added according to the formula $(Mo_{1-y}Ta_y)(Al_{0.4}Si_{0.6})_2$ and through X-ray crystallographical examination it was ascertained that other phases than C 40 started to appear when $y$ in the formula exceeded 0.7. In FIG. 6 it is shown how the tensile strength increases with an increased Ta content up to $y=0.7$ and then again decreases. FIG. 7 indicates that the Ta-addition has no appreciable influence on the porosity of the material until the limit of solubility at $y=0.7$ is passed when the porosity will rise very steeply.

*Example 9*

Figure 8:
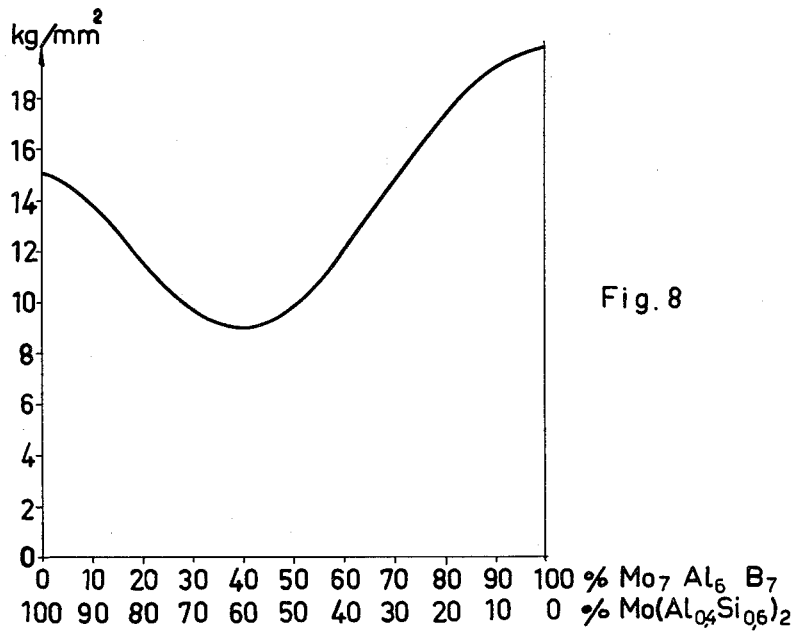
Figure 9:
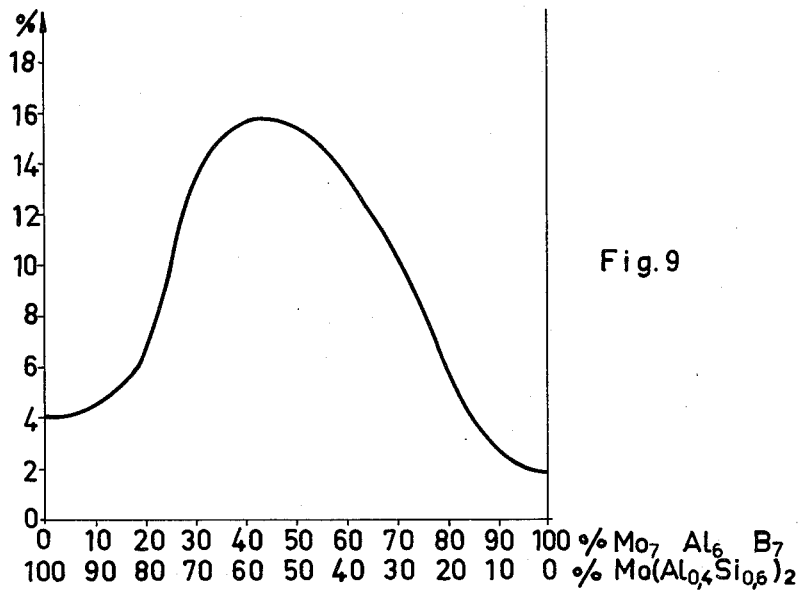
Figure 10:
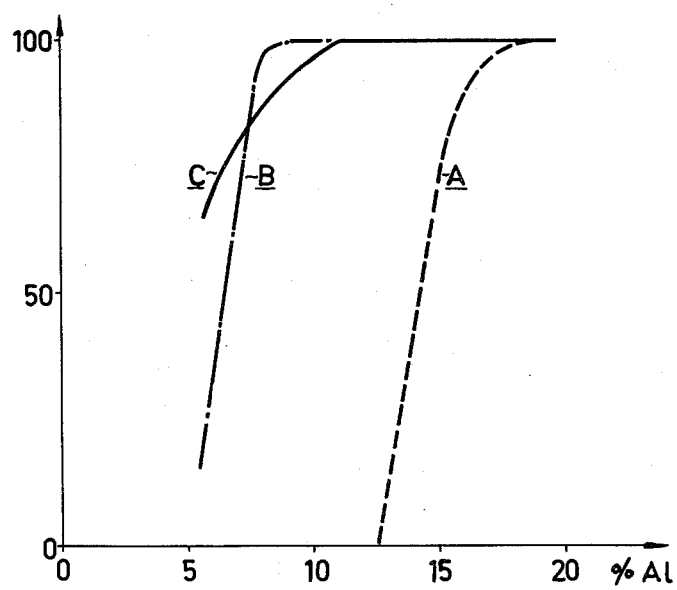

Finally the corresponding two properties are illustrated in FIGS. 8 and 9 in respect of a mixture of $Mo(Si_{0.6}Al_{0.4})_2$ and $Mo_7Al_6B_7$ in which the solubility of boron in $Mo(Si_{0.6}Al_{0.4})_2$ is very low, i.e. corresponding only to a few percent by weight of $Mo_7Al_6B_7$ or a few tenths percent by weight of B. Also from these figures it will be quite clear that the properties deteriorate when the two phases are mixed. Any larger amounts of boron should accordingly be avoided.

It was also ascertained by ageing tests that in all three Examples 7 to 9, the resistivity against oxidation attacks of the pure C 40-phase was satisfactory and that as soon as there was a pure C 40-phase the ratio between its specific resistances at 1600° C. and 20° C. was between 1 and 6 which makes the material quite suitable as electric resistance material.

What we claim is:

1. An electric resistance heating element of high mechanical strength which is oxidation resistant at high temperatures consisting essentially of an incandescent heating zone and two terminal end portions, said incandescent zone consisting essentially of a sintered body having metallically conducting particles constituted by a silico-aluminide which forms a pure phase with crystals of the lattice structure C 40 and of the composition $(Mo_{1-y}M_y)(Si_{1-x}Al_x)_2$ in which $x$ ranges from 0.1 to 0.6 and $y$ ranges from 0.0 to 0.7 and M is at least one metal selected from the group consisting of titanium, zirconium, hafnium, tantalum, niobium, vanadium, chromium and tungsten, said terminal end portions consisting of metallically conducting tetragonal molybdenum disilicide, the incandescent zone and terminal end portions being of substantially the same cross-sectional area.

2. The element of claim 1 wherein the metal M of the sintered body is zirconium and $y$ does not exceed 0.2.

3. The element of claim 1 wherein the metal M of the sintered body is tantalum and $y$ does not exceed 0.7.

4. The element of claim 3 wherein $x$ is 0.2 and $y$ is 0.05.

5. The element of claim 1 wherein the metal M of the sintered body is titanium, $y$ is 0.3 and $x$ is 0.2.

6. The element of claim 1 wherein the sintered body contains boron in an amount not exceeding 0.3% by weight of the sintered body.

7. The element of claim 1 wherein the sintered body is an electrically insulating refractory base member having a surface coating about 10–500 microns thick, the coating being applied by flame spraying metallization.

References Cited in the file of this patent

UNITED STATES PATENTS

| 2,406,275 | Wejnarth | Aug. 20, 1946 |
| 2,412,373 | Wejnarth | Dec. 10, 1946 |
| 2,412,374 | Wejnarth | Dec. 10, 1946 |
| 2,412,375 | Wejnarth | Dec. 10, 1946 |
| 2,412,376 | Wejnarth | Dec. 10, 1946 |
| 2,445,296 | Wejnarth | July 13, 1948 |
| 2,622,304 | Coffer | Dec. 23, 1952 |
| 2,747,260 | Carlton et al. | May 29, 1956 |
| 2,848,586 | Wainer et al. | Aug. 19, 1958 |
| 2,955,145 | Schrewelius | Oct. 4, 1960 |

FOREIGN PATENTS

| 478,016 | Great Britain | Jan. 11, 1938 |
| 731,614 | Great Britain | June 8, 1955 |
| 731,616 | Great Britain | June 8, 1955 |